(12) United States Patent
Dettenberger et al.

(10) Patent No.: US 8,105,200 B2
(45) Date of Patent: Jan. 31, 2012

(54) ELECTROMOTIVE BRAKE ACTUATOR

(75) Inventors: Stefan Dettenberger, Ansbach (DE); Wilhelm Wolf, Petersaurach (DE)

(73) Assignees: Oechsler Artiengesellschaft, Ansbach (DE); Lucas Automotive GmbH, Koblenz (DE)

( * ) Notice: Subject to any disclaimer, the term of this patent is extended or adjusted under 35 U.S.C. 154(b) by 944 days.

(21) Appl. No.: 11/660,028

(22) PCT Filed: Mar. 9, 2006

(86) PCT No.: PCT/EP2006/002171
§ 371 (c)(1),
(2), (4) Date: May 1, 2008

(87) PCT Pub. No.: WO2006/094804
PCT Pub. Date: Sep. 14, 2006

(65) Prior Publication Data
US 2008/0293534 A1    Nov. 27, 2008

(30) Foreign Application Priority Data

Mar. 11, 2005  (DE) .................... 20 2005 004 108 U
May 11, 2005  (DE) ......................... 10 2005 021 767

(51) Int. Cl.
*F16H 3/44* (2006.01)
(52) U.S. Cl. .................... 475/323; 475/156; 475/157
(58) Field of Classification Search ............... 475/154, 475/156, 157, 323, 325
See application file for complete search history.

(56) References Cited

U.S. PATENT DOCUMENTS

| | | | | |
|---|---|---|---|---|
| 2,769,430 A | * | 11/1956 | Geyer | 60/698 |
| 2,860,528 A | * | 11/1958 | Butterfield et al. | 475/155 |
| 3,144,107 A | * | 8/1964 | Davies et al. | 192/13 R |
| 4,642,029 A | * | 2/1987 | Cedoz | 416/129 |
| 6,066,065 A | * | 5/2000 | Breen | 475/312 |
| 6,394,235 B1 | | 5/2002 | Poertzgen et al. | |
| 6,431,330 B1 | | 8/2002 | Poertzgen et al. | |

FOREIGN PATENT DOCUMENTS

| | | |
|---|---|---|
| DE | 197 32 168 C1 | 1/1999 |
| DE | 197 48 318 C1 | 5/1999 |
| EP | 0 372 219 A2 | 6/1990 |
| EP | 1 364 850 A1 | 11/2003 |
| JP | 2001-173733 | 6/2001 |
| JP | 2001-173773 | 6/2001 |
| JP | 2002-349643 | 12/2002 |
| WO | WO 02/099312 A1 | 12/2002 |

* cited by examiner

*Primary Examiner* — Ha D. Ho
(74) *Attorney, Agent, or Firm* — MacMillan, Sobanski & Todd, LLC

(57) ABSTRACT

An actuator for the electromotive actuation of a parking or stop brake, especially of a private car comprises, downstream on the electric motor, a planetary wheel transmission which is axially cascaded in a multi-stage manner and comprises a centering pin which is radially mounted on the two front ends thereof and extends coaxially to the output shaft, on the radial overdefined bearing arrangement thereof. Respectively one planet carrier comprising a pinion is embodied, along the centering pin, as a sun wheel for the planet wheels on the planet carrier of the following transmission step.

10 Claims, 1 Drawing Sheet

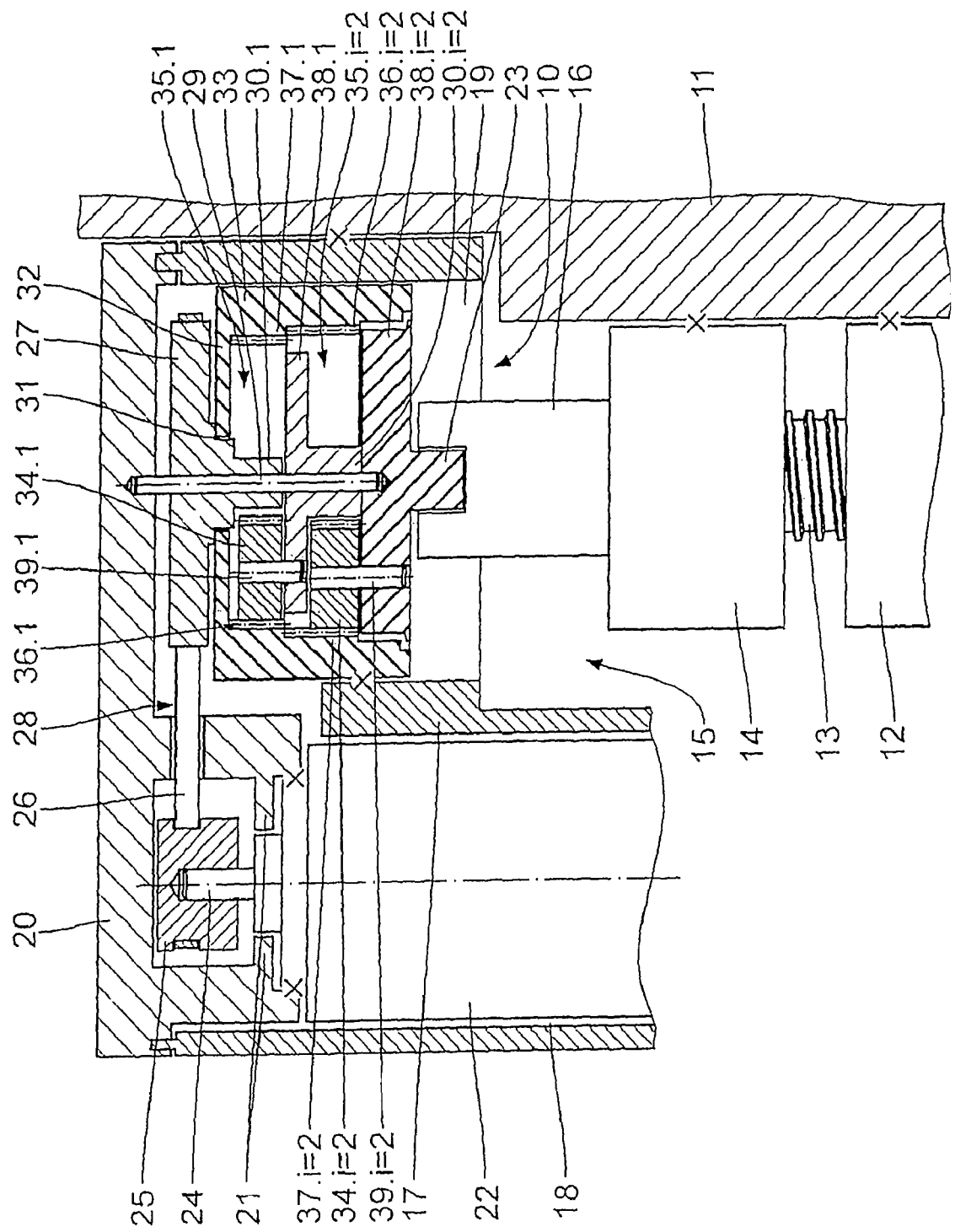

ELECTROMOTIVE BRAKE ACTUATOR

CROSS-REFERENCE TO RELATED APPLICATIONS

This application is a national stage of International Application No. PCT/EP2006/002171 filed Mar. 9, 2006, the disclosures of which are incorporated herein by reference in entirety, and which claimed priority to German Patent Application No. 20 2005 004 108.4 filed Mar. 11, 2005 and German Patent Application No. 10 2005 021 767.2 filed May 11, 2005, the disclosures of which are incorporated herein by reference in entirety.

BACKGROUND OF THE INVENTION

The invention relates to an actuator which is equipped with a multistage planetary gear mechanism and has an output shaft before its last planet carrier.

Such an actuator with an electromotively drivable gear mechanism for activating a parking brake is known from EP 1 364 850 A1, with a belt transmission between a motor and a torque converter. The latter is preferably configured as a multistage planetary gear mechanism with an output shaft which is arranged at the last planet carrier. The planet carriers rotate in an internal toothing of the hollow cylindrical gear mechanism housing. Such a gear mechanism provides the increase in torque which is to be aimed at for such an actuator, by virtue of a large step down ratio for the rotational speed in order to be able to use small, high speed electric motors with a correspondingly low output torque. The transmission housing of the previously known actuator is rotatably mounted counter to a restoring spring force so that the instantaneously transmitted torque can be measured by measuring means using the current rotational angle setting. Said publication with a priority date earlier than that of the present document does not contain anything about structural considerations regarding the mounting of the gear mechanism, especially in order to overcome the stressing of materials which increases with the torque.

JP 2 001 173 773 A discloses a planetary gear mechanism which is cascaded axially in multiple stages and is connected directly downstream of a drive motor, whose pinion functions as its first sunwheel on the motor output shaft which projects into the gear mechanism in a cantilevered fashion. The planet wheels of the successive gear mechanism stages each roll in the obliquely toothed inner casing surface of the hollow cylindrical gear box housing which has a constant internal diameter over its length. On the respective planet carrier, a pinion serves as a sunwheel for the planet wheels of the next gear mechanism stage, the last of which is equipped with a stub axle as an output shaft which is radially mounted in the end wall of the gear mechanism housing and projects from it. On said output shaft, a pin which projects into the housing in a cantilevered fashion is attached coaxially in a rotationally fixed fashion in a backwards direction, said pin ending at an axial distance before the motor shaft with its first sunwheel. The planet carriers with their sunwheels rest in a freely rotatable fashion on said pin. So that said sunwheels do not run up against one another axially due to the load, the pin is equipped in each case with an axial stop as a spacer element in a nonmoveable and nonrotatable fashion between the front end of a sunwheel and the planet carrier which is axially adjacent as the next gear mechanism stage. This makes mounting such a gear mechanism extremely difficult. Under load the mechanical stressing of each central bearing pin which is secured only in the output shaft becomes so critical that in the surroundings of the front end of the pin which protrudes freely in the opposite direction it is no longer ensured that the planet wheels will engage in the inner toothing of the housing. For this reason alone such a structure is not satisfactory for the load occurring during operation, with its torque which rises in the longitudinal direction of the hollow cylindrical gear mechanism housing as a result of the central pin being mounted only on one side; even if said structure corresponds to the structural principle of avoiding an over determined bearing.

Actuators of a similar generic type with belt transmission between the motor and gear mechanism are known for a hydraulic parking brake or a mechanical parking brake from DE 1 97 32 168 C1, and corresponding U.S. Pat. No. 6,394,235 B1, both of which are incorporated by reference herein in entirety, or from DE 1 97 48 318 C1, and corresponding U.S. Pat. No. 6,431,330 B1, both of which are incorporated by reference herein in entirety. Harmonic drives or squash plate mechanisms are provided as gear mechanisms with an extremely large step down ratio and a self locking effect. The kinetics of this increase in torque owing to a very high rotational speed gearing reduction ratio in turn requires materials to be used which can be loaded to a very high degree and are therefore costly.

However, using high strength special materials to cope with the forces occurring in the gear mechanism entails costs which are hardly compatible with the cost pressures placed on suppliers in the motor vehicle industry.

BRIEF SUMMARY OF THE INVENTION

In view of these conditions, the present invention is based on the technical problem of specifying an actuator of the generic type which meets practical requirements in terms of reliable functioning despite a high step down gear ratio, that is to say a large increase in torque, with a planet carrier bearing system which is structurally less complex but can be subjected to large loads during operation.

This feature is achieved according to the invention by the combination of the essential features specified in the main claim. According to these, contrary to the generally acknowledged structural rules, a bearing system which is over defined, even multiply, is selected for the planet stages which are cascaded coaxially between the input and output shafts. A so-called centering pin, which extends coaxially through the gear mechanism between the input and output shafts is used for this as a central bearing shaft which is mounted radially at its two front ends and along which both central bearing points and peripheral bearing points which are offset axially with respect to one another occur. For this purpose, the centering pin is connected in a rotationally fixed fashion to one of the planet carriers located approximately centrally between the first of the sunwheels and the last of the planet carriers. However, otherwise it is rotatable not only with respect to the other planet carriers with their sunwheels but also in its two end bearings. This embodiment makes it possible to dispense with materials which can withstand extreme loads, in particular the end-toothing planet wheels and their internally toothed support rings which are fixed to the housing can be economically injection molded from fiber-reinforced plastic.

Other advantages of this invention will become apparent to those skilled in the art from the following detailed description of the preferred embodiments, which read in light of the accompanying drawing.

BRIEF DESCRIPTION OF THE DRAWINGS

FIG. 1—The single FIGURE of the drawing shows, in an axial longitudinal section which is abstracted to what is functionally essential, an actuator housing for holding parallel a small, high speed electric drive motor and a planetary gear mechanism which is driven by the latter via a rotational speed step down belt drive and is cascaded in multiple stages in order to activate a movement transducer in a rotational fashion and with a large torque before the braking mechanism of a land motor vehicle.

DETAILED DESCRIPTION OF THE INVENTION

A parking brake 12 is mounted on part of a vehicle bodywork 11 which does not rotate with a vehicle wheel to be braked. Such rotationally fixed, mechanical attachments are indicated in the drawing in each case by the symbol "x". An actuator 15 can activate the brake 12 directly or it can be activated via a spindle rod or similar thrust linkage 13, from a movement transducer 14, which is also fixed to the bodywork, in order to convert a rotational movement into a linear movement. The torque which is necessary to activate the brakes is supplied by the actuator 15 by means of an electromotor 22 and a step down gear mechanism 10 which follows it and, depending on the installation requirements, via a rigid, articulated or flexible shaft 16.

The housing 17 of the actuator 15 is also secured in a rotationally fixed fashion to the bodywork 11. It comprises, viewed in the axial cross section (that is to say transversely with respect to the plane of the drawing), essentially an 8-form arrangement of two hollow cylinders which are connected to one another essentially coaxially, specifically along their generatrices and can have different axial lengths and diameters. One of the hollow cylinders serves as a motor receptacle 18 (outlined cutoff in the longitudinal direction in the drawing), and the other hollow cylinder serves as a gear mechanism receptacle 19. These two receptacles 18, 19 end on the drive end, that is to say remotely from the brake 12, preferably open in a common transverse plane, where they can then be closed off by a cover 20 which is mounted thereon in a frictionally locking or positively locking fashion. The cover 20 is equipped in the direction of the motor receptacle with profiles 21 which are inserted in a positively locking fashion or, as outlined, integrally formed on, said profiles 21 locking the motor 22 in a rotationally fixed fashion in its pocket-shaped receptacle 18.

The motor shaft 24 which is connected in a rotationally fixed fashion to the rotor (not illustrated) of the motor 22 is equipped in the illustrated exemplary embodiment with a toothed drive 25 for a laterally ribbed belt 26 which is wrapped around a pulley 27 with a significantly larger circumference in order to bring about a step down ratio of the rotational speed of the motor 22 via this transmission 28. The pulley 27 is fitted at the output end, in a coaxially rotationally fixed fashion, with a stub axle which acts as an input shaft of the gear mechanism 10 and has end toothing as a pinion 30 at its free front end.

The input shaft is preferably fabricated in one piece together with its pinion 30 and, if appropriate, together with the pulley disk 27, from sintered metal and is encapsulated by injection molding with plastic, especially if planet wheels 34 which engage at the output end and, if appropriate, a toothed belt 26 which engages at the drive end are also composed of plastic.

The input shaft, that is to say also its pinion 30, rotates about a centering pin 29 which is guided radially with its adjacent front end in a blind hole-shaped opening in the housing 17 or its cover 20. The pin 29 also serves as a central bearing shaft for the sunwheels on the planet carriers 38 of the planetary gear mechanism 10 which is cascaded in multiple stages, said bearing shaft extending coaxially in one piece through the entire gear mechanism 10 from its radial bearing in front of the input shaft as far as its radial bearing on the output shaft 23.

The input shaft through which the centering pin 29 engages is additionally radially mounted in the drive front end of a pot-shaped gear mechanism housing 33. For this reason, the shaft section which rotates about the pin 29 engages, in front of the pinion 30, through the gear mechanism housing 33, through a central opening 31, acting as a bearing ring, in the bottom 32 of said gear mechanism housing 33. In addition to this radial bearing in the opening 31, the input shaft is provided with radial bearings in the gear mechanism housing 33, at the opposite end of said shaft section, by virtue of the fact that its pinion 30 is supported radially as a sunwheel by means of planet wheels 34 in the annular inner casing surface of the housing 33. The radial loads which are applied to the input shaft at the drive end are thus distributed among a plurality of radial support points distributed axially with respect to one another by virtue of over defined bearing along the pin 29.

In order to secure the gear mechanism housing 33 in a structural, rotationally fixed fashion in the actuator 15, said gear mechanism housing 33 is introduced axially into the actuator housing 17 and, when the axial setpoint position is reached, it is secured therein in a frictionally locking fashion by clamping or preferably in a positively locking, rotationally fixed fashion by snapping in integrally formed-on bending springs with latch hooks, as illustrated in the drawing again by the symbols "x".

Within the gear mechanism housing 33, the pinion 30.1 which is formed on the input shaft, and is therefore the first, serves directly as the sunwheel for at least one planet wheel 34.1, and in the interest of quiet running preferably for two or three planet wheels 34.1, which likewise have end toothing (only one of which is shown in the sectional illustration in the drawing) of a first planetary gear mechanism stage 35.1. In the latter, the respective planet wheel 34.1 intermeshes with the hollow wheel inner toothing 36.1 of a support ring 37.1 which is fixed to the housing and with which the gear mechanism housing 33 is formed as outlined (or else is equipped separately in a rotationally fixed fashion).

At least the support ring 37, and preferably in fact the entire gear mechanism housing 33, are injection molded plastic parts. At any rate, in the outlined embodiment as an axially extending gear mechanism housing 33 the sequence of support rings 37 is reinforced by fibers enclosed by injection molding, in order to more reliably take up the torques which increase via the planet stages 35 in the axial direction, and to be able to conduct them away. At any rate, the planet wheels 34 in the first planet stages 35 are also produced by injection molding, again with a mechanical reinforcement through embedded fibers.

In the gear mechanism housing 33, one planet carrier 38 rotates per gear mechanism stage 35 with its planet wheels 34, offset axially along the bearing or centering pin 29 which extends through the gear mechanism 10. Said planet carrier 38 is equipped on its driving side or sunwheel side with an axis-parallel pin 39 for flying bearing of the respective planet wheel 34. These planet carriers 38, which are also referred to as webs and are subject to high mechanical stress with the bearing of the planet wheels 34, are preferably shaped elements made of sintered metal which do not have to be encapsulated by injection molding with plastic since they do not have a toothing engagement with plastic profiles.

Behind a gear mechanism stage 35.1 its planet carrier 38.1 serves at the same time, with a pinion 30.2 which is provided on it, as a power output for a downstream planetary gear mechanism stage 35.2 with its end toothed planet wheels 34.2 which rotate between this sunwheel (pinion 30.2) and its internally toothed support ring 37.2. The number of planet wheels 34 in the following stages is at least equal to that in the preceding stage 35, and is preferably higher because of the increasing torque and is therefore at any rate not lower than in the preceding stage 35; in the drawing, again just one of four planet wheels 34.2 here is illustrated. In a way which corresponds to the increasing torque, the planet wheels 34 of successive gear mechanism stages roll in support rings 37 with increasing diameters. The planet wheels 34 rotate, with their bearing pins 39.2, the following planet carrier 38.2, and so on, as far as the last planet carrier 38.$i$ (i=2 is indicated) which is arranged in the gear mechanism housing 33. At any rate, owing to the maximum torque reached here, the planet wheels 34.$i$ on the last carrier 38.$i$ are composed, like the latter, of bare sintered material (or of sintered material which is encapsulated by injection molding).

This latter gear mechanism stage (35.$i$) of the gear mechanism stages 35 which are cascaded in this way by means of their carrier pinions 30 is equipped directly with the central output shaft 23, instead of with a pinion, in order to output torque. For this reason, the output shaft 23, comparable with the described bearing measures on the input shaft, is mounted radially axially offset again and at the same time multiply over defined, specifically on the one hand by means of the last planet carrier 38.$i$, in the output end, open front end of the pot shaped gear mechanism housing 33 (as illustrated by the stepped profiling as a bearing ring in the sketched drawing); furthermore, toward the inside of the housing 33, axially offset by means of this last carrier 38.$i$ due to the radial supporting effect of its planet wheels 34.$i$ in its inner ring 36.$i$; and finally by means of this end of the centering pin 29 which engages, as a radial sliding bearing, in a rotatable fashion in the last planet carrier 38.$i$, or even engages through the latter and into the adjoining output shaft 23. On the other hand, the pin 29 is secured in a planet carrier 38 which is located in front of it, approximately centrally between the input and output shafts, and is pressed in somewhat so that it is once more mounted radially axially in front of it by means of its planet wheels 34, in their support ring 37 which is fixed to the housing.

To mount the gear mechanism, on the one hand the input shaft with its pinion 30.1 is introduced from the outside through the opening 31 in the bottom 32 of the housing and, on the other hand, the pin 29 with the planet carrier 38 which is supported in a rotationally fixed fashion, and if appropriate with further planet carriers which are supported rotatably in front of it, are plugged through the central bore in the input shaft from the inside of the open gear mechanism housing 33 lying opposite, and said pin 29 is equipped, if appropriate, with further planet stages 35, lying opposite at the free front end. Owing to the stepped increase in the diameter, at the output end, of its support rings 37 which are fixed to the housing, the planetary gear mechanism 10 can easily be mounted from the open pot side (from top to bottom in the drawing) into the gear mechanism housing 33 which tapers in a stepped fashion, and its functioning can be checked before the gear mechanism housing 33 which is equipped completely in this way is itself introduced into its receptacle 19 of the actuator housing 17. Finally, only the cover 20 with its opening provided therein is fitted, as a radial bearing, over the free front end, projecting through the input shaft, of the centering bearing pin 29.

A wheel set or the sketched belt drive 28 can then serve to make a geared connection to the motor 22 resting in its receptacle 18, under the cover 20.

The actuator 15 for electromotively activating the parking brake 12, in particular in passenger cars, thus has, to summarize, a planetary wheel gear mechanism 10 which is cascaded axially in multiple stages for providing rotational speed step down with a corresponding rise in the torque which can be delivered. In this context, in each case a planet carrier 38 with a pinion 30 is provided in accordance with an axial sequence of internally toothed support rings 37 which are fixed to the housing, said pinion 30 itself being configured as a sunwheel for the planet wheels 34 on the planet carrier 38 of the next gear mechanism stage 35, while the planet carrier 38.$i$ of the last gear mechanism stage 35.$i$ with its central stub axle no longer serves as a sunwheel but rather as an output shaft 23 for outputting torque. According to the invention, a centering pin 29 which is mounted radially at both its ends and which itself serves for providing multiply over defined, radial bearing of the input and output shafts 23 as well as of the planet wheels 38 or sunwheels, located between the latter and offset axially with respect to one another, of the individual gear mechanism stages 35 extends through the input shaft and as far as the output shaft 23 through the gear mechanism 10 in a coaxial fashion; the centering pin 29 being connected, in order to provide it with additional radial bearing in its center region, to one of the planet carriers 38 in a rotationally fixed fashion, and in addition the gear mechanism housing 33 is embodied or equipped at each of its two ends as a bearing ring for the input shaft with the first of the sunwheels, also mounted on the centering pin 29, or for the last planet carrier 38 which also provides bearing for the centering pin 29 at the output shaft 23.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. An electromotive brake actuator which is equipped with a multistage planetary gear mechanism and has an output shaft before a last planet carrier thereof, wherein the actuator has a housing with a radial bearing for a front end of a centering pin which extends through the gear mechanism into the output shaft and on which planet carriers which are offset axially with respect to one another, of a plurality of coaxially cascaded planetary gear mechanism stages are radially mounted, the planet carriers of which are each equipped with a pinion as a sunwheel for a planet wheel, rolling in a support ring fixed to the housing, of the next stage of the planetary gear mechanism stages, the centering pin being arranged in a rotationally fixed fashion in one of the planet carriers which is located approximately centrally between a sunwheel and the last planet carrier.

2. The actuator as claimed in claim 1, wherein a gear mechanism housing which is embodied or equipped with the support ring is embodied or equipped at two front ends thereof in each case as a bearing ring for the sunwheel which is also mounted on the centering pin, or for the last planet carrier which also supports the centering pin.

3. The actuator as claimed in claim 1, wherein in the first planetary gear mechanism stage, at least two planet wheels are arranged, and in the respective next planetary gear mechanism stage at least as many planet wheels as in the preceding stage are arranged on the planet carriers which are mounted radially on the centering pin, the planet wheels being mounted within support rings which each have an enlarged diameter.

4. The actuator as claimed in claim 1, wherein the sunwheel, mounted radially on the centering pin, of an input shaft is equipped, outside a gear mechanism housing, with a pulley of a transmission of a motor.

5. The actuator as claimed in claim 1, wherein an input shaft which is equipped at a front end with the sunwheel and is mounted radially on the centering pin engages through a bottom opening serving as a further radial bearing for the input shaft in a gear mechanism housing.

6. The actuator as claimed in claim 1, wherein a housing cover which supports the centering pin radially at a front end is also equipped with profiles for securing a motor in a motor receptacle.

7. The actuator as claimed in claim 1, wherein the support ring for the planet wheels of the gear mechanism stages which follow one another axially are embodied in a gear mechanism housing made of fiber-reinforced plastic.

8. The actuator as claimed in claim 1, wherein the planet wheels at least of the first planet stage are fabricated from fiber-reinforced plastic.

9. The actuator as claimed in claim 1, wherein the planet carriers and also the planet wheels of at least the last planet stage are produced from sintered metal.

10. The actuator as claimed in claim 1, wherein the sunwheel is fabricated from sintered metal and is encapsulated by injection molding with plastic.

* * * * *